Feb. 1, 1966 G. F. BOST, JR 3,233,217
VEHICLE SIGNAL DEVICE
Filed Dec. 18, 1962 2 Sheets-Sheet 1
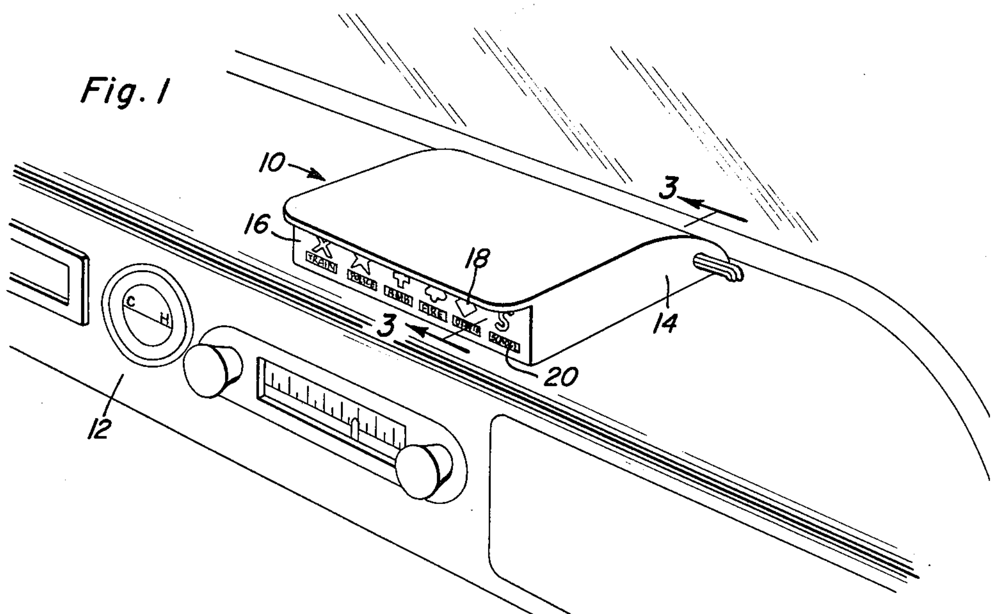
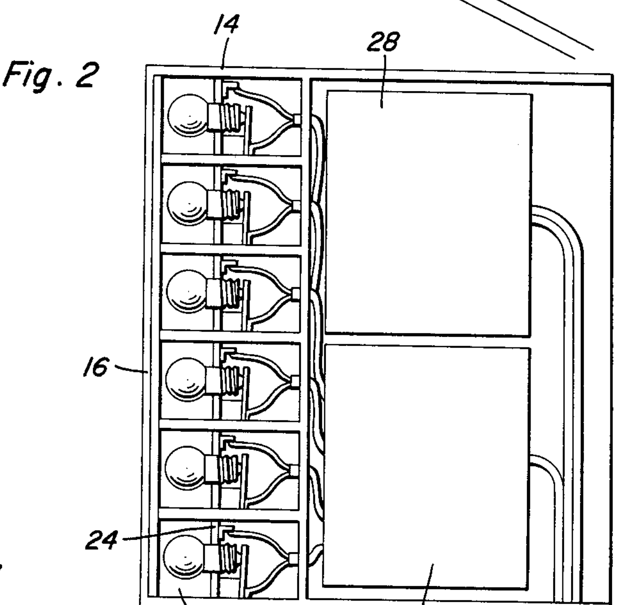
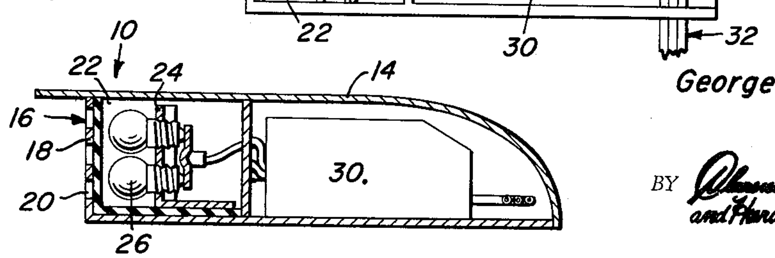
George F. Bost, Jr.
INVENTOR.
BY Clarence A. O'Brien and Harvey B. Jacobson
Attorneys VEHICLE SIGNAL DEVICE
Filed Dec. 18, 1962
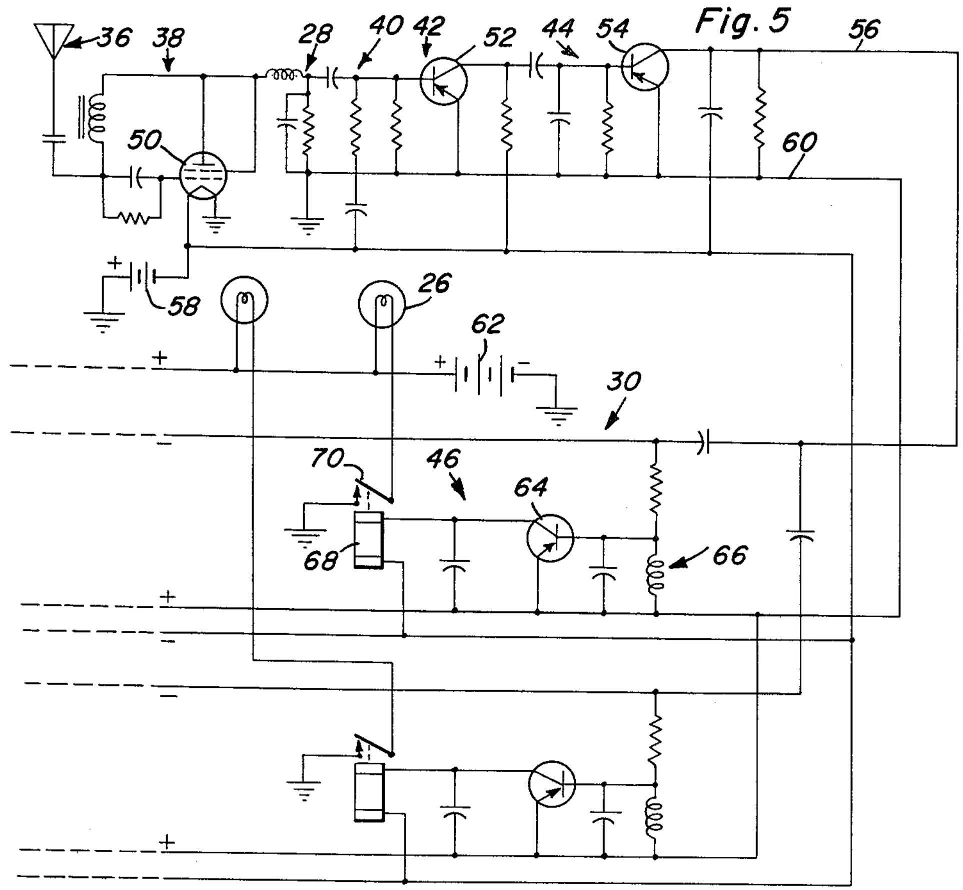
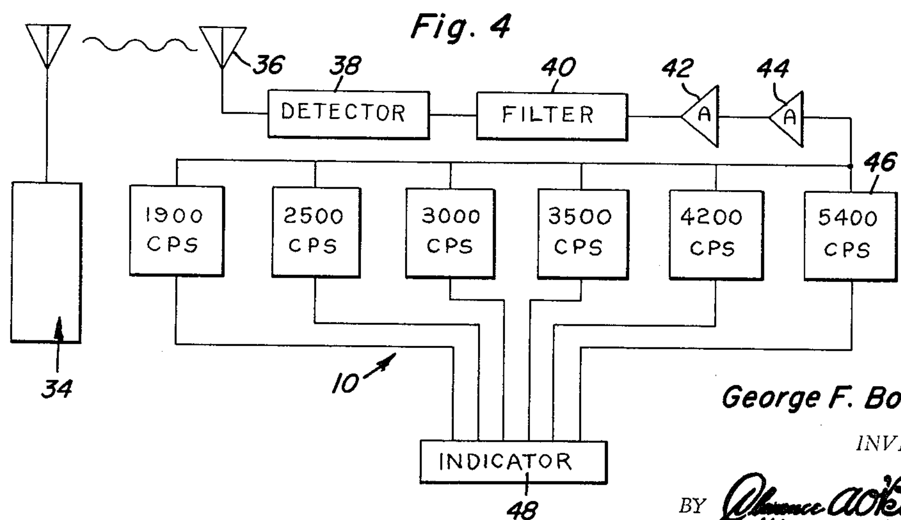
George F. Bost, Jr.
INVENTOR.
BY Clarence A. O'Brien
and Harvey B. Jacobson
Attorneys United States Patent Office 3,233,217

Patented Feb. 1, 1966

3,233,217

VEHICLE SIGNAL DEVICE

George F. Bost, Jr., Miami, Fla., assignor of one-third to William L. Crandall and one-third to William R. Woodburn, both of Miami, Fla.

Filed Dec. 18, 1962, Ser. No. 245,447
9 Claims. (Cl. 340—33)

This invention relates to a signal alerting system for vehicles of all types and more particularly an emergency alerting device which provides a warning for the occupant of the vehicle of an approaching hazard or danger and identifies the nature or type of danger to be expected.

It is therefore a primary object of the present invention to provide an emergency alerting device which is now particularly useful in connection with automotive vehicles although not necessarily restricted thereto since it may be similarly useful when installed in other types of vehicles such as aircraft and marine vessels.

Another object of the present invention is to provide an emergency alerting system utilizing radiant energy as the signalling medium with facilities for receiving such radiant energy signals from a plurality of different emitting sources and identifying the origin of such signals.

A further object of the present invention is to provide a system whereby danger signals may be emitted by radio transmitter devices mounted in a plurality of different installations such as police cars, ambulances, fire trucks, railroad locomotives, as examples of mobile installations as well as in stationary installations including for example railroad crossings, school areas, etc. Thus, the transmitters will issue danger signals at a predetermined carrier frequency wherever warning devices were heretofore utilized such as sirens, bells, whistles, flashes, etc. The danger signals so emitted by the transmitters will be picked up by a specially designed receiver installed within each vehicle when such vehicle is within a predetermined range of the source of danger whether it be mobile or stationary. Accordingly, a limited range receiver will be utilized in connection with the present invention, responding to the predetermined carrier frequency to set into operation a warning indicator which provides a danger signal proximity alert as well as to identify the signal source.

It is therefore another important object of the present invention, to provide a signal alerting receiver associated with a danger alerting indicator with a selective relay device responding to different modulating frequencies associated with the different danger emitting sources, to identify the source through the indicator. The indicator would therefore be in the form of a plurality of lamps illuminating identifying indicia that may be mounted in any convenient location within the automotive vehicle such as the dashboard. It is however contemplated, that other types of alerting indicators may be utilized either in lieu of the illuminating type or in addition thereto such as sound emitting devices which issue sounds characteristic of the different sources to be identified when the proximity alert is given.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a partial perspective view illustrating one typical automotive vehicle installation for the emergency signal alerting device associated with the system of the present invention.

FIGURE 2 is a top plan view of the device illustrated in FIGURE 1 with the top removed.

FIGURE 3 is a sectional view taken substantially through a plane indicated by section line 3—3 in FIGURE 1.

FIGURE 4 is a diagrammatic illustration of the system of the present invention.

FIGURE 5 is an exemplary electrical circuit diagram of the vehicle mounted signal alerting device.

Referring now to the drawings in detail, it will be observed from FIGURES 1, 2 and 3, that the emergency alerting device of the present invention generally referred to by reference numeral 10 is mounted within an automotive type of vehicle, preferably above the dash panel 12 thereof so as to be within easy and immediate view of the vehicle operator. The device 10 therefore includes an enclosing housing 14 having any suitable shape or design exposing to the operator's view, a front panel 16 on which are mounted a plurality of identifying symbols or indicia 18 and associated labeling portions 20. Any number of such identifying indicia and labels may be mounted as needed, with a corresponding number of illuminating chambers 22 therebehind. Each of the illuminating chambers 22 is therefore provided with a lamp supporting bracket 24 adapted to mount a pair of lamp bulbs 26 for illuminating both the identifying symbol portion 18 and label portion 20. Also mounted within the housing rearwardly of the illuminating chambers 22, and electrically connected to the lamps 26, are a radio receiving component 28 and a selective relay component 30. Power for energizing the radio receiving component 28 is therefore derived from the power source for the vehicle while a separate power supply may be provided for energizing the lamps 26. Electrical conduits 32 may therefore extend from one side of the housing 14 for suitable connections to the electrical power supplies and the antenna for component 28.

Referring now to FIGURE 4 in particular, it will be observed that the device 10 is associated with a plurality of radio transmitter devices 34 one of which is diagrammatically illustrated. These transmitter devices as hereinbefore indicated, are adapted to be mounted in both mobile and stationary installations so as to provide a proximity alert for the vehicle in which the device 10 is mounted by radiating electromagnetic energy of a limited range and at a predetermined carrier frequency set aside for such purpose. However, the carrier frequency will be code modulated in accordance with the type of installation with which the transmitter device 34 is associated so as to enable the emergency alerting device 10 to identify the source of the signal. Accordingly, the antenna 36 associated with the device 10 and electrically connected thereto will receive a signal from any one or more of the transmitter devices 34 within a predetermined distance therefrom, this signal being detected by the detector component 38 which picks up the signal for transmission to the filter component 40 from which the modulated signal is amplified by amplifier stages 42 and 44 and fed to a plurality of selective relay circuits 46 each of which responds to a different modulating frequency tone or other signal code so as to energize the indicator 48 which is also operative to identify the signal source by means of the selective relay circuit 46 which responds thereto. The indicator 48 may therefore take the form of a plurality of lamp devices as described with respect to FIGURES 1, 2 and 3.

Referring now to FIGURE 5 in particular, it will be observed that the signal alerting device 10 may involve a detector stage 38 capacitively coupled to a tuning circuit tuned to receive the predetermined carried frequency signal producing an output from the detector tube 50 which is inductively coupled to the filter circuit 40 in which low level ambient signals are eliminated and the first stage transistor 52 biased to a conductive state so as to produce an amplified output fed to the second stage transistor 54 from which an amplified signal is delivered by a negative potential line 56 to each of the relay circuits 46 of the selective relay component 30 to which the line 56 is capacitively coupled. Power for the heater element of the detector tube 50 may therefore be supplied by the vehicle power source 58 such as the negative terminal of the battery which is also electrically connected to the transistor amplifier stages for providing an initial negative bias on the base elements thereof. Accordingly, when a signal is fed to the base circuits of the transistors, a common positive operating potential is established in the conductor 60 which is also connected to each of the selective relay circuits 46 to render them operative only upon receipt of the signal by the receiving component 28. In this manner, unintentional energization of the identifying lamps 26 is avoided as well as to avoid a power drain on the vehicle battery 58 and the separate electrical power supply 62 connected to each of the lamps 26.

Each of the selective relay circuits 46 is therefore provided with a code detector transistor 64 the emitter of which is initially biased by the operating potential when established in the line 60 so that the transistor may be triggered into a conductive state when the base circuit 66 is in resonance with the signal fed thereto by the signal output line 56. Accordingly, each of the base circuits 66 of the respective relay circuits 46, will be in resonance with a different modulating frequency ranging for example from 1900 cycles per second to 5400 cycles per second as indicated in FIGURE 4. Thus, each of the relay circuits 46 will respond to a given signal tone so as to establish an energizing circuit for the relay coil 68 when the transistor 64 is rendered conductive. Upon energization of the relay coil 68, relay switch 70 is closed so as to complete an energizing circuit through the associated lamps 26 to both provide a proximity alert and identify the origin of the signal as hereinbefore indicated. Accordingly, the number of relay circuits 46 provided will correspond to the number of different types of transmitters or different types of signal sources for which the device 10 is designed to provide an alert.

From the foregoing description, the construction, operation and utility of the danger alerting system of the present invention will be apparent. The alerting device and system with which it is associated, is particularly needed at the present time because of the high concentration of automotive vehicles and the necessity for providing vehicle operators under heavy traffic conditions with a warning as to the approach of emergency vehicles such as police cars, ambulances, fire trucks, as well as to warn of the approach of the vehicle to locations such as school and railroad crossings where an additional measure of alterness is required. The need for such a device as provided by the present invention is made even more essential because of soundproof vehicle constructions now being utilized and the noise producing equipment carried by automotive vehicles which both distract the vehicle operator and prevent him from hearing the danger sounds emitted by emergency vehicles. In this regard, the signal source identifying feature of the present invention and the ability of the device to respond to a plurality of such signals so as to identify each of said signal sources, if more than one is in the vicinity, represents an ideal solution to the problem. It will also be appreciated, that because of the single carrier frequency feature of the system of the present invention and the limited range of the radiated signals picked up, as a purposeful attribute thereof for proximity indication purposes, renders the equipment of the present invention economical in cost, and compact in size. This enables the system of the present invention to be widely distributed and readily adopted by the appropriate authorities as a sorely needed safety measure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a plurality of radiant energy emitting devices of limited range adapted to dispatch different source identifying signals from a plurality of relatively movable locations, an emergency alerting device mounted within a moving vehicle comprising: signal receiving means operative to receive signals from all of said radiant energy emitting devices at any instantaneous position of the vehicle within said limited range of each of said energy emitting devices; selective relay means rendered operative in response to receipt of said signals by said signal receiving means, and signal identifying indicator means operatively connected to said selective relay means and responsive to the receipt of said signals to identify the origin of said signals and indicate proximity to said relatively movable locations from which said signals originate.

2. The combination of claim 1, wherein said receiving means includes, signal detecting means tuned to said single carrier frequency, amplifying means operatively connected to the selective relay means for establishing an operating potential therefor in response to receipt of said signals by the detecting means, and filter means operatively connecting the detecting means to the amplifying means and the relay means for transmitting signals at the different modulating frequencies to the relay means.

3. The combination of claim 2, wherein said selective relay means comprises a plurality of relay circuits connected in parallel to the receiving means and simultaneously rendered operative upon establishment of said operating potential, each of said relay circuits including, a relay coil, triggering means responsive to one of the modulating frequencies to render the relay circuit conductive for energizing said relay coil.

4. The combination of claim 3 wherein said signal identifying indicator means comprises, a plurality of indicator lamps, a source of energy connected to each of said lamps, relay switch means connected to said lamps and operative to complete energizing circuits through selected lamps in response to energization of said selective relay means, and signal identifying indicia means illuminated by the respective indicator lamps when energized.

5. The combination of claim 1, wherein said selective relay means comprises a plurality of relay circuits connected in parallel to the receiving means and simultaneously rendered operative upon establishment of an operating potential, each of said relay circuits including a relay coil, triggering means responsive to one of a plurality of modulating frequencies to render the relay circuit conductive for energizing said relay coil.

6. The combination of claim 1 wherein said signal identifying indicator means comprises, a plurality of indicator lamps, a source of energy connected to each of said lamps, relay switch means connected to said lamps and operative to complete energizing circuits through selected lamps in response to energization of said selective relay means, and signal identifying indicia means illuminated by the respective indicator lamps when energized.

7. The combination of claim 1, wherein said receiving means includes, signal detecting means tuned to a single carrier frequency, amplifying means operatively connected to the selective relay means for establishing an operating potential therefor in response to receipt of said signals by the detecting means, and filter means operatively connecting the detecting means to the amplifying means and the relay means for transmitting signals at different modulating frequencies to the relay means.

8. The combination of claim 7, wherein said selective relay means comprises a plurality of relay circuits connected in parallel to the receiving means and simultaneously rendered operative upon establishment of said operating potential, each of said relay circuits including, a relay coil, triggering means responsive to one of the modulating frequencies to render the relay circuit conductive for energizing said relay coil.

9. In a warning system for indicating the approach of a plurality of different emergency vehicles to at least one moving vehicle equipped with an alerting device wherein each of said emergency vehicles when in motion emits signal energy at a common carrier frequency modulated at different modulating frequencies corresponding to the respective emergency vehicles, said alerting device comprising, receiving means tuned to said common carrier frequency for receiving and demodulating signal energy emitted by all of the emergency vehicles within a limited signal range of each of said emergency vehicles, a plurality of identifying indicators mounted in said moving vehicle, each indicator corresponding to a different emergency vehicle, and means operatively connecting each of said indicators to the receiving means for energization in response to demodulation of signal energy at one of the different modulating frequencies.

References Cited by the Examiner

UNITED STATES PATENTS

| | | | |
|---|---|---|---|
| 1,808,022 | 6/1931 | Del Prete | 340—333 |
| 1,978,286 | 10/1934 | Sommer | 340—32 |
| 2,203,871 | 6/1940 | Koch | 340—33 |
| 2,233,183 | 2/1941 | Roder | 325—47 |
| 2,282,102 | 5/1942 | Tunick | 325—47 |
| 2,393,021 | 1/1946 | Check | 340—163 |

NEIL C. READ, *Primary Examiner.*